United States Patent
Jin et al.

(10) Patent No.: US 9,647,303 B2
(45) Date of Patent: May 9, 2017

(54) ENERGY STORAGE SYSTEM PREVENTING SELF FROM OVERHEATING, A METHOD FOR PREVENTING ENERGY STORAGE SYSTEM FROM OVERHEATING AND A METHOD FOR FORMING A HEAT DISSIPATION COATING ON ENERGY STORAGE SYSTEM

(75) Inventors: Hong Jin, Beijing (CN); George H. Brilmyer, Johnson City, TN (US); Michael T. Nispel, Malvern, PA (US); Dongxue Ren, Beijing (CN)

(73) Assignees: National Institute of Clean-and-Low-Carbon Energy, Beijing (CN); Shenhua Group Corporation Limited, Beijing (CN)

( * ) Notice: Subject to any disclaimer, the term of this patent is extended or adjusted under 35 U.S.C. 154(b) by 188 days.

(21) Appl. No.: 14/395,378

(22) PCT Filed: Apr. 20, 2012

(86) PCT No.: PCT/CN2012/074434
§ 371 (c)(1),
(2), (4) Date: Mar. 12, 2015

(87) PCT Pub. No.: WO2013/155700
PCT Pub. Date: Oct. 24, 2013

(65) Prior Publication Data
US 2015/0194713 A1    Jul. 9, 2015

(51) Int. Cl.
*H01M 10/65*    (2014.01)
*H01M 10/6551*    (2014.01)
(Continued)

(52) U.S. Cl.
CPC ..... *H01M 10/6551* (2015.04); *H01M 2/0292* (2013.01); *H01M 2/206* (2013.01);
(Continued)

(58) Field of Classification Search
None
See application file for complete search history.

(56) References Cited

U.S. PATENT DOCUMENTS 3,834,945 A    9/1974    Jensen
4,913,985 A    4/1990    Baer
(Continued)

FOREIGN PATENT DOCUMENTS

CN    200952916 Y    9/2007
CN    201562696 U    8/2010
(Continued)

OTHER PUBLICATIONS

International Search Report dated Feb. 7, 2013, issued in International Application No. PCT/CN2012/074434, 4 pages.
(Continued)

*Primary Examiner* — Patrick Ryan
*Assistant Examiner* — Wyatt McConnell
(74) *Attorney, Agent, or Firm* — Senniger Powers LLP

(57) ABSTRACT

The present invention discloses an overheat prevention energy storage system preventing self from overheating, comprising a heat dissipating external surface, wherein at least a portion of the external surface is coated with at least one layer of heat dissipation coating of high emissivity. The present invention further discloses a method for preventing overheat of the energy storage system and a method for forming at least one layer of heat dissipation coating of high emissivity onto at least part of an external surface of the energy storage system or assemblies thereof.

19 Claims, 6 Drawing Sheets

(51) Int. Cl.
*H01M 2/02* (2006.01)
*H01M 2/20* (2006.01)
*H01M 10/6553* (2014.01)
*H01M 10/613* (2014.01)
*H01M 10/06* (2006.01)
*H01M 2/10* (2006.01)

(52) U.S. Cl.
CPC ......... *H01M 10/06* (2013.01); *H01M 10/613* (2015.04); *H01M 10/6553* (2015.04); *H01M 2/1022* (2013.01); *H01M 2/1077* (2013.01)

(56) References Cited

U.S. PATENT DOCUMENTS

| | | |
|---|---|---|
| 5,356,735 A | 10/1994 | Meadows et al. |
| 5,385,793 A | 1/1995 | Tiedemann et al. |
| 5,682,671 A | 11/1997 | Lund et al. |
| 5,695,891 A | 12/1997 | Misra et al. |
| 6,407,553 B1 | 6/2002 | Anderson et al. |
| 6,512,347 B1 | 1/2003 | Hellmann et al. |
| 6,533,031 B1 | 3/2003 | Garcia et al. |
| 7,531,270 B2 | 5/2009 | Buck et al. |
| 7,651,811 B2 | 1/2010 | Aker et al. |
| 7,967,256 B2 | 6/2011 | Wong |
| 2003/0178899 A1 | 9/2003 | Aeschlimann et al. |
| 2010/0255360 A1 | 10/2010 | Umemoto et al. |

FOREIGN PATENT DOCUMENTS

| | | |
|---|---|---|
| CN | 101894986 A | 11/2010 |
| CN | 102163757 A | 8/2011 |
| CN | 102612301 A | 7/2012 |
| CN | 102618141 A | 8/2012 |
| DE | 19724020 A1 | 1/1998 |

OTHER PUBLICATIONS

Written Opinion dated Feb. 7, 2013, issued in International Application No. PCT/CN2012/074434, 13 pages.

ENERGY STORAGE SYSTEM PREVENTING SELF FROM OVERHEATING, A METHOD FOR PREVENTING ENERGY STORAGE SYSTEM FROM OVERHEATING AND A METHOD FOR FORMING A HEAT DISSIPATION COATING ON ENERGY STORAGE SYSTEM

REFERENCE TO CORRESPONDING APPLICATIONS

This application is the 371 National Stage Application based on International PCT Application No. PCT/CN2012/074434, filed Apr. 20, 2012.

TECHNICAL FIELD

The present invention relates to an energy storage system, particularly to a battery and a system thereof, and more particularly to a lead-acid battery and a system thereof, that is capable of preventing self from overheating. The present invention further relates to a method for preventing overheat of the energy storage system and a method for forming at least one layer of heat dissipation coating of high emissivity on at least part of the external surface of the energy storage system or assemblies of the energy storage system.

BACKGROUND OF THE INVENTION

As an energy storage system, a battery and a system thereof are means for storing electric energy so as to restore the energy when needed. Typically, a cell includes two electrodes arranged in the electrolyte, i.e. an anode and a cathode. As known in related technologies, an electrical apparatus to be operated is usually connected across the cathode and anode at two ends to obtain electrical energy from the cell.

Invented in 1859, the lead acid battery has more than 150 years of history. It still remains to be one of the most popular batteries nowadays and has been widely used in technical fields such as electricity, communication, railway, petroleum, aviation, irrigation, coal, geology, medical care, rail transportation, national defense facilities and so on.

A lead-acid battery as well as a system thereof is such a device that converts electrical energy into chemical energy for storage and then converts the chemical energy into electrical energy to be supplied to electrical apparatuses for use when needed. The cathode active substance in the lead-acid cell is $PbO_2$, and the anode active substance is sponge-like lead (Pb), and the electrolyte is liquid $H_2SO_4$. The process of charging and discharging the lead-acid cell is achieved by electrochemical reactions. As shown in the following reaction equation, Pb (anode) and lead oxide (cathode) react with $H_2SO_4$ during the discharging process of the lead-acid cell to generate lead sulfate. The charging process exhibits a reverse reaction of the discharging process.

Cathode reaction: 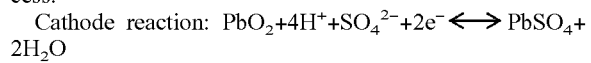

Anode reaction: 

Overall reaction: 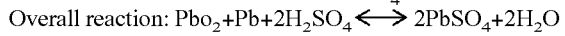

Currently, the lead acid battery is widely used all over the world with more than 50% of battery market share due to its reliability and low cost. Traditional lead-acid batteries are mostly used in small-scale and low-rate applications, such as those in auxiliary devices or back-up power, so the overheat and heat dissipation problems are not so noticeable, nor are there any particular solutions to these problems. However, with recent development of smart grid and the increasing amount of interest in renewable energy (e.g. wind power, solar energy and so on), the demand in large-scale energy storage system has never been more imperative. At present, lead-acid batteries have already been used in Uninterruptible Power Supplies (UPS). The emerging applications in technology pose new challenges to lead-acid batteries and other types of batteries. For example, overheating occurs in almost any large-scale applications that are usually of high rate and multi-cycle, which shortens the cycle life and sometimes even causes permanent damage to the batteries and especially to the lead acid batteries. Therefore, the thermal management technology is extremely important for the lead acid battery in large-scale applications in maintaining proper system health etc.

The conventional solution for overheating is to over-size the batteries, so that the relative discharge rate and the depth of discharge are smaller. But this, on the other hand, increases the total system cost tremendously.

The prior art lead-acid batteries are mainly classified into two types: flooded type and valve-regulated type. The heat dissipation problem is more severe in the valve-regulated type lead-acid batteries (VRLA batteries) than the flooded type lead-acid batteries because excess electrolyte in cells of the latter fills the three-dimensional space in the cells except for those occupied by the electrodes, thereby the thermal contact between internal members of the cells is enhanced. Gases are generated during charging and the gases remove heat from the cell via water loss and acid mist. In contrast, in a cell of a valve-regulated type lead-acid battery, the acid liquid is absorbed in saturation by a separator (e.g. absorptive glass fiber fabric), so there is no excess liquid electrolyte in the cell. The limited contact of the acid, separators and plates with the plastic case walls limits the heat transfer out of the cell because of the lack of a heat dissipation passage and therefore increases the operating temperature, which limits the cycle life of valve-regulated type lead-acid battery and thus their potential applications in large-scale.

Overheating of the valve-regulated type lead-acid battery, as a matter of fact, is mainly caused by heat release from chemical reactions and ohmic heat (resistance heat generated from grid plate, bus-bar, separator, terminal post and etc. of the cell due to their resistance). The chemical reaction is very intense, for example the oxygen recombination reaction during the charging process is exothermic with an enthalpy of 68.32 kcal/mol. When the temperature of the positive plate is increased, the rate of oxygen evolution increases rapidly and a bigger portion of oxygen recombines at the negative plate, giving rise of a further temperature rise there. The cell temperature can easily exceed 80° C. and the cell can go into 'thermal runaway' thus forcing the cell temperature even higher. In some instances thermal runaway can lead to softening or even burning of the polymer case. The ohmic heat ($I^2R$) also comes from the inside of the cell. The shell of a cell is generally made of polymer materials, and the heat dissipation contact area is very limited through metallic components of a cell such as grid plate, bus-bar and terminal post, thus heat within the interior of the cell is not easy to be dissipated.

In high rate applications of a battery, according to Arrhenius Equation, reaction rate of any chemical reaction is generally increased to as much as two times with the increase of temperature by 10 degrees. This principle is applicable to product life approximation based on failure mode (chemical reaction, such as corrosion, oxygen recombination reaction and so on), in particular applicable to the life approximation of a lead-acid battery. According to *IEEE Recommended practice for Maintenance, Testing and Replacement of Vented Lead-acid Batteries for Stationary Applications*, IEEE power engineering society, IEEE std 450™-2002, 3 Apr. 2003, it is calculated that the life of a lead acid battery is shortened by 50% when the working temperature of the lead acid battery increases from 25 to 33.

In order to prevent overheating of a battery and its system and prolong life thereof, various solutions have been proposed at present for thermal control or thermal management during operation of the battery, wherein most of the solutions focus on thermal control or thermal management on a side or bottom of a cell, e.g. U.S. Pat. No. 7,967,256, U.S. Pat. No. 7,531,270, U.S. Pat. No. 6,533,031, U.S. Pat. No. 6,512,347, U.S. Pat. No. 6,407,553, U.S. Pat. No. 5,695,891, U.S. Pat. No. 5,356,735, U.S. Pat. No. 5,385,793, U.S. Pat. No. 4,913,985. These modified designs relate to built-in arrangements which are also technically challenging in maintenance and heat dissipation. As stated above, heat generated in a valve-regulated type lead-acid battery is difficult to be dissipated to the outside, so heat dissipation effect is not quite satisfactory when the prior art thermal control or thermal management method is applied to the valve-regulated type lead-acid battery.

U.S. Pat. No. 7,651,811 discloses a traction battery, comprising a ventilated plastic cover for covering an electrical connection strap, wherein a fan forces air to flow through the electrical connection strap of the battery to reduce the operating temperature of the battery. U.S. Pat. No. 3,834,945 discloses to use water to cool terminal posts and inter-cell electrical connection strap for a traction battery. No matter cooling is performed by air or water, improvement in heat exchange is not satisfactory due to the limited heat-exchanging area of the electrical connection strap. In addition, the design of a structure having a function of cooling the battery, e.g. the added water cooling system or a fan, etc., makes the entire structure of the battery more complex and the volume thereof large and heavy, which results in a complicated maintenance and installation process.

CN200952916Y discloses an improved structure of a heat radiation device for improving heat radiation efficiency of a mechanical apparatus which generates heat during operation, wherein a nanometer carbon layer is attached in a physical manner to the outside of the heat radiating fin of the machine, so that the heat radiating effect of the heat radiation device is enhanced by increasing the whole heat radiating area and by rapid radiation characteristic of the nanometer carbon layer. This document, however, does not disclose any effective composition of the nanometer carbon layer, nor teach or suggest application of the same to other technical fields. No reports have been found so far to successfully solve the overheating problem of an energy storage system by applying a heat dissipation coating, in particular a heat dissipation coating of high emissivity to an energy storage system, e.g. a valve-regulated type lead-acid battery and its system.

The above documents are incorporated herein in entirety by reference.

Therefore, the present invention is aimed to improve one or more defects in the prior art.

SUMMARY OF THE INVENTION

The objective of the present invention is to provide an energy storage system preventing self from overheating and a method for preventing overheat of the energy storage system so that the energy storage system can exhibit better heat dissipation effect to avoid excessively high operating temperature thereof under high rate charging/discharging condition and to prolong life thereof and also the energy storage system can be installed easily and simply.

Another objective of the present invention is to provide a method for forming at least a layer of heat dissipation coating of high emissivity onto at least a portion of an external surface of the energy storage system or assemblies thereof.

The above objectives can be achieved by an energy storage system having the following technical features: the energy storage system comprises a heat dissipating external surface, wherein at least a layer of heat dissipation coating of high emissivity is applied onto at least a portion of the external surface.

Preferably, the external surface includes exposed surfaces of the energy storage system, an energy storage unit constituting the energy storage system, an electrical connection element (electrical connection strap) between the energy storage units, terminal posts of the energy storage unit, or a support. By way of applying a heat dissipation coating of high emissivity onto exposed heat dissipating surfaces of e.g. the terminal posts and/or the electrical connection elements, the transferring and spreading of heat from the heat dissipating surface to the surroundings by radiation, convection and/or thermal conduction is accelerated so that the temperature of the exposed heat dissipating surface of the external surface of the terminal posts and/or of the electrical connection elements is decreased rapidly. Particularly, because the terminal posts and/or the electrical connection elements have a function of conducting heat from the interior of the energy storage unit to the exterior thereof, the temperature of the external surface of the terminal posts and/or of the electrical connection elements is decreased rapidly, and it is possible to further reduce temperature inside the energy storage unit. This method therefore effectively reduces the operating temperature of the energy storage system and prolongs the lifespan thereof.

In a preferred embodiment of the invention, the heat dissipation coating of high emissivity contains nano particles or the like. An example of the nano particles or the like includes a carbon nanotube, nanorod, nanoball, or nano particulate and so on. Doping nano particles or the like of high emissivity, e.g. carbon nanotubes into the paint is more preferable for improving heat emissivity of the coating. Preferably, the nano particles or the like have a particle size of less than 100 nanometers.

In order to facilitate heat dissipation of the energy storage system, the heat dissipation coating of high emissivity has a rate of black body radiation of greater than 0.8 and a thermal conductivity of greater than 150 W/m·K at a temperature of 300K. Preferably, the heat dissipation coating of high emissivity includes various oxides, such as $SiO_2$, $ZrO_2$, $CrO_2$, $Al_2O_3$ and/or various carbides, such as $ZrC$, $SiC$, and/or various nitrides such as $Si_3N_4$.

Preferably, when there are at least two layers of the heat dissipation coating of high emissivity, the composition, thickness or curing temperature and time for each layer may be identical or different. For instance, each layer of the coating may have a thickness of less than or equal to 200-300 μm.

When a heat dissipation coating of high emissivity doped with nano particles or the like, such as carbon nanotubes, is applied or formed onto an exposed heat dissipating surface of the energy storage system, one or more layers of the heat dissipation coating of high emissivity may be formed on the same surface. Thus, the paint may be subject to once or multiple times of application, and each layer of the coating may be cured at a temperature equal to or greater than room temperature, e.g. 50. Preferably, in order to further improve the heat dissipation effect, the number of the layers of the heat dissipation coating of high emissivity may be 2, 3 or 4. In other words, the heat dissipation paint of high emissivity is applied onto the exposed heat dissipating surface of the energy storage system, e.g. the exposed heat dissipating surface of the terminal posts and/or of the electrical connection elements (straps) by a two-step, three-step or four-step application. Thanks to the heat dissipation coating of high emissivity, the heat dissipation effect and heat dissipation rate of the heat dissipating surface are improved considerably.

The energy storage system may be a battery and its system, in particular a valve-regulated type lead-acid battery and its system.

On the other hand, the present invention provides a method for preventing overheating of an energy storage system comprising a heat dissipating external surface, wherein at least a portion of the external surface is coated or formed with at least one layer of heat dissipation coating of high emissivity.

On the other hand, the present invention provides a method for applying or forming at least one layer of heat dissipation coating of high emissivity onto at least part of the external surface of the energy storage system or assemblies thereof, comprising the following steps in sequence: (1) mixing active ingredients or precursor of the coating and stirring until a uniform paint mixture is formed; (2) applying the uniform paint mixture onto at least part of the external surface to form a homogeneous coating; (3) curing the coating at a curing temperature equal to or above room temperature until it is cured completely; (4) optionally, repeating the above steps (1), (2) and (3) in sequence to form multiple layers of the heat dissipation coating of high emissivity onto the at least part of the external surface.

Preferably, multiple layers, e.g. 2-4 layers of heat dissipation coating of high emissivity are applied or formed onto at least part of the external surface by the above method. By stacking multiple layers of coating, more interfaces, micro-cracks and/or micro-pores may be introduced therebetween to form a structure which is more favorable for enhancing the emissivity of the entire coating.

Preferably, each of the coating layer has a curing temperature of 40° C.-100° C., e.g. 50° C. The curing temperature selected from this range may facilitate formation of a coating having a large number of pores and micro-cracks, thereby further intensifying thermal emissivity.

The formation or application of a heat dissipation coating of high emissivity, such as a heat dissipation coating doped with nano particles or the like, onto an exposed heat dissipating surface of the energy storage system, e.g. the external surface of the terminal posts and/or of the electrical connection straps, endows the exposed heat dissipating surface of the energy storage system with high emissivity which improves heat exchange between the heat dissipating surface and the surroundings to facilitate rapid cooling of the heat dissipating surface and to further reduce the operating temperature of the energy storage system and to prolong lifespan thereof.

BRIEF DESCRIPTION OF THE DRAWINGS

The drawings which constitute a part of the description show the exemplary embodiments of the invention and are intended to construe the principle of the invention with the description, in which.

DETAILED DESCRIPTION OF THE EMBODIMENTS

Figure 1:
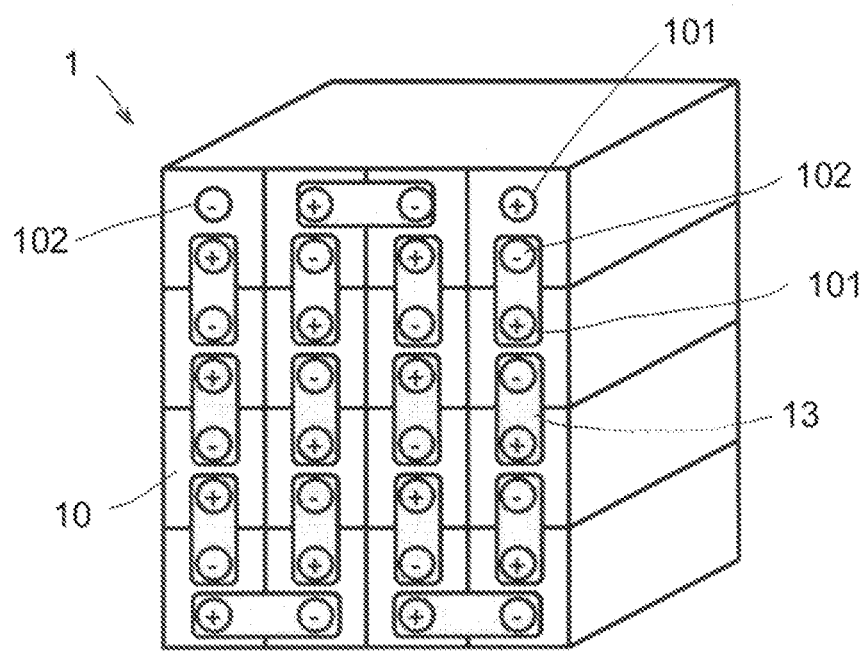
FIG. 1 is a schematic view of a prior art energy storage system, e.g. a battery system as a whole.

FIG. 1 is a view of an embodiment of a prior art energy storage system (which is generally referred to as an electrical energy storage system). The energy storage system may be a battery and a system thereof, a capacitor and a system thereof, or other chemical or physical energy storage means. A battery system will be illustrated in detail below as an example. The battery system 1 includes a plurality of battery units (energy storage units) 10, each having one or more cells (energy storage cells). The plurality of battery units 10 may be arranged in any array, and each has two terminal posts 101 (a positive terminal pole post) and 102 (a negative terminal pole post) leading from the interior thereof. An electrical connection between the battery units 10 is done by means of an electrical connection strap (electrical connection element) 13 one end of which is connected to the positive terminal post 101 of one battery unit 10 and the other end of which is connected to the negative terminal post 102 of another battery unit 10. The electrical connection strap 13 is made of a conductive material for conducting current among the battery units 10. The battery system 1 further includes terminal posts (posts), i.e. a positive post and a negative post, for achieving electrical connection with an external circuit.

Figure 2:
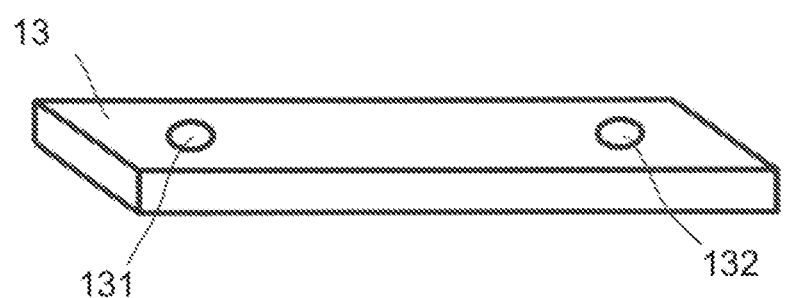
FIG. 2 is a view of an electrical connection strap (electrical connection element) for connecting the terminal posts of a battery unit (i.e. energy storage unit) of the prior art energy storage system e.g. a battery system.

A traditional electrical connection strap 13, as shown in FIG. 2, is a flat plate with a smooth surface and has connecting holes 131, 132 at both ends for connecting with the terminal posts. In the embodiments of the present invention, the electrical connection strap 13 is made of copper, with a dimension of 85 mm (length)×30 mm (width)×2 mm (thickness).

The battery and its system will generate a large amount of heat during the charging/discharging process. The components such as terminal posts, electrical connection straps and metal grids, due to the structural characteristics thereof, form thermal conductors for conducting and dissipating heat from an internal space of the battery units 10 to the outside. In an embodiment of the present invention, one or more layers of heat dissipation coating of high emissivity, formed by a heat dissipating paint of high emissivity, are formed or applied onto exposed heat dissipating surfaces of the terminal posts and/or of the electrical connection straps.

The heat dissipation paint of high emissivity includes various oxides such as $SiO_2$, $ZrO_2$, $CrO_2$, $Al_2O_3$ and/or various carbides, such as ZrC, SiC, and/or various nitrides such as $Si_3N_4$. It is reported that currently the heat dissipation paint of high emissivity has been widely applied to machines such as spacecrafts, boilers, ovens and so on.

The technical term "heat dissipation coating of high emissivity" herein refers to a coating that has a higher emissivity than a surface to be coated within a relatively wide wavelength (e.g. 1-20 μm).

In a preferred embodiment of the invention, the heat dissipation paint of high emissivity includes or is doped with nano particles or the like. The paint containing nano particles or the like herein is referred to as nano paint, and a coating formed thereby is called a nano coating. More preferably, the nano particles or the like have a particle size of less than 100 nanometers.

In another embodiment of the invention, an example of the nano particles or the like includes a carbon nanotube, nanorod, nanoball, or nano particulate and so on. The paint containing carbon nanotubes herein is referred to as carbon nanotube paint, and a coating formed thereby is referred to as a carbon nanotube coating.

The emissivity of the paint or coating is mainly dependent upon the composition thereof and is quite sensitive to the structure of the coating and the state of the surface to which the coating is attached. The factors that influence the emissivity of coating include doping, surface roughness and/or texture of the coating, coating thickness and etc. The carbon nanotubes possess C—C chemical bonds, remarkable emissivity, superior thermal conductivity, high strength and outstanding specific surface area. Doping nanotubes to the paint not only improves tensile strength and fracture toughness of the coating, but also provides a large number of new interfaces between the carbon nanotubes and the coating matrix, which leads to more reflections of electromagnetic waves inside the coating, so more heat can be absorbed. According to Kirchhoff's law, at equilibrium for a given wavelength and temperature, the emissivity of an object is equal to its absorption. Thus, the more heat is absorbed by an object, the more heat is radiated. As a result, doping nanotubes to a heat dissipation coating of high emissivity may increase the emissivity of the coating significantly.

Preferably, the heat dissipating paint or coating of high emissivity has a black body radiation rate of greater than 0.8 and a thermal conductivity of greater than 150 W/m·K at a temperature of 300K.

According to the present invention, it is possible to accelerate dissipation of heat from the coated surface to the surroundings by forming or applying a heat dissipation coating of high emissivity onto e.g. the exposed heat dissipating surface of the external surface of the electrical connection straps and/or of the terminal post, because the high emissivity of the coating itself is favorable for increasing the emissivity of the coated surface. Furthermore, application of the coating containing nano particles, from a macroscopic point of view, will roughen the external surface of the electrical connection straps and/or of the terminal posts to increase the exposed heat dissipating surface of the entire energy storage system, thereby further increasing reflection of the electromagnetic wave. Consequently, the heat is emitted and spread rapidly from e.g. the external surface of the electrical connection straps and/or of the terminal posts to the surroundings, so that the temperature of the exposed surface of the terminal posts is reduced. In addition, because the terminal posts form heat dissipating channels extending outwards from the interior of the battery units, a temperature difference between the portion of the terminal posts inside the battery units and the exposed portion is increased so that the heat is conducted and spread rapidly from the interior of the battery units to the exposed surface of the electrical straps and/or of the terminal posts. Therefore, generally speaking, heat can be conducted rapidly from the interior of the battery units to the ambient environment to reduce operating temperature of the battery and its system and to prolong life of the battery.

Each layer of the heat dissipation coating of high emissivity has a thickness of less than or equal to 200-300 μm.

In another embodiment of the invention, by means of a multi-step, e.g. two-step, three-step or four-step application process, multiple layers e.g. two to four layers of heat dissipation coating of high emissivity are formed or applied onto the exposed external surface of the electrical connection straps and/or of the terminal posts, wherein the process of applying each layer of coating includes the steps of: (1) mixing active ingredients or precursor of the heat dissipating paint of high emissivity and stirring until a uniform paint mixture is formed; (2) applying the uniform paint mixture onto the external surface to form a homogeneous coating; (3) curing the homogeneous coating at room temperature or a curing temperature above the room temperature until it is cured completely, e.g. baking for 4-24 hours. The paint mixture may include solvent and/or cement for improving binding force of the paint. In the case of at least two layers of heat dissipation coating of high emissivity, curing temperature or curing time for each layer may be identical or different. During the curing step of the application process, gas thus formed can be enclosed inside the coating due to rapid temperature increase, which may create pores, micro-interfaces and/or micro-cracks to facilitate formation of more porous layers for reflecting the interface of the electromagnetic wave, thus obtaining better absorption and emissivity characteristics. Preferably, each layer of the heat dissipation coating of high emissivity has a curing temperature of 40-100° C., e.g. 50° C. In addition, when there are at least two layers of heat dissipation coating of high emissivity, different coatings are overlapped so that an additional interface is introduced therebetween and thus more micro cracks, pores and/or micro-interfaces are created to facilitate reflection, which is more advantageous for improving emissivity of the entire coating and accelerating radiation and transfer of heat from the coated surface to the outside.

According to the invention, when multiple layers of the heat dissipation coating of high emissivity is formed or coated on the above external surface, the composition, thickness, curing temperature and time for each layer may be identical or different.

The following is an example of a flat electrical connection strap (electrical connection element), where a comparison of heat dissipating capacity or heat storage capacity is made between a traditional electrical connection strap and an electrical connection strap of the present invention applied with a carbon nanotube coating (a heat dissipation coating of high emissivity containing carbon nanotubes). The carbon nanotube coating is a commercialized paint ZS-411 from ZHISHENG. In order to simulate temperature variation of different electrical connection straps that have absorbed equivalent amount of heat, first a fixed heat source (200 W) is provided, and an equivalent amount of heat flow is allowed to flow through the traditional electrical connection strap and the electrical connection strap of the present invention, and the surface temperatures of the electrical connection straps are measured in real time by means of thermoelectric couples. The surface temperatures of the two electrical connection straps are measured within 1500 seconds in terms of different coatings and different application conditions and then are compared. It is found from the test that the surface temperature of the electrical connection strap of the present invention is apparently lower than that of the traditional electrical connection strap, which means that the heat dissipating capacity of the electrical connection strap of the present invention is far greater than that of the traditional electrical connection strap.

Figure 3A:
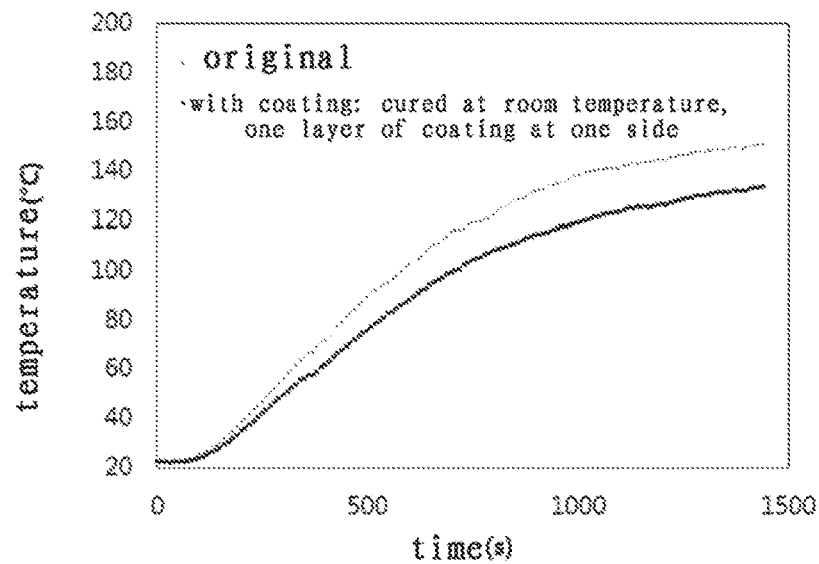
FIGS. 3a-3c show comparison curves of heat dissipating capability between an electrical connection strap coated with one layer of heat dissipation coating of high emissivity at one side cured at room temperature, a temperature of 50° C., a temperature of 100° C. respectively and a traditional electrical connection strap without a heat dissipation coating of high emissivity.
Figure 3B:
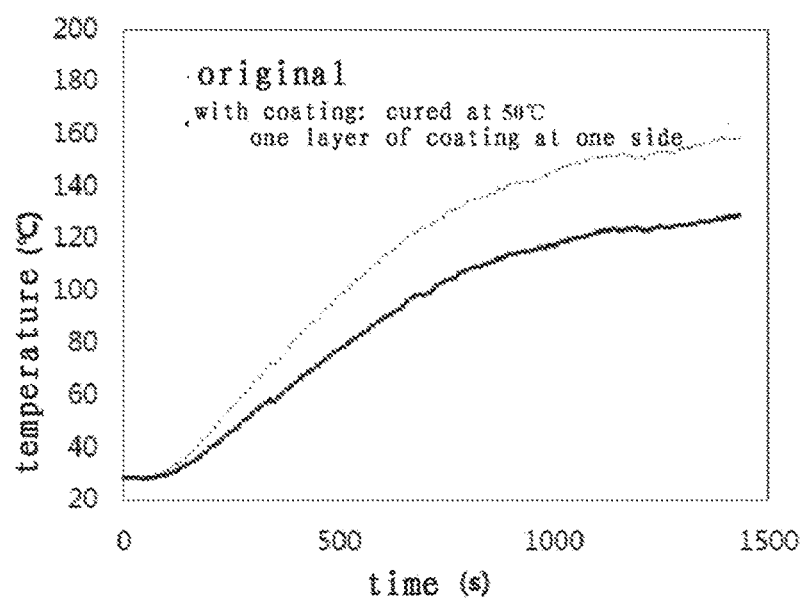
Figure 3C:
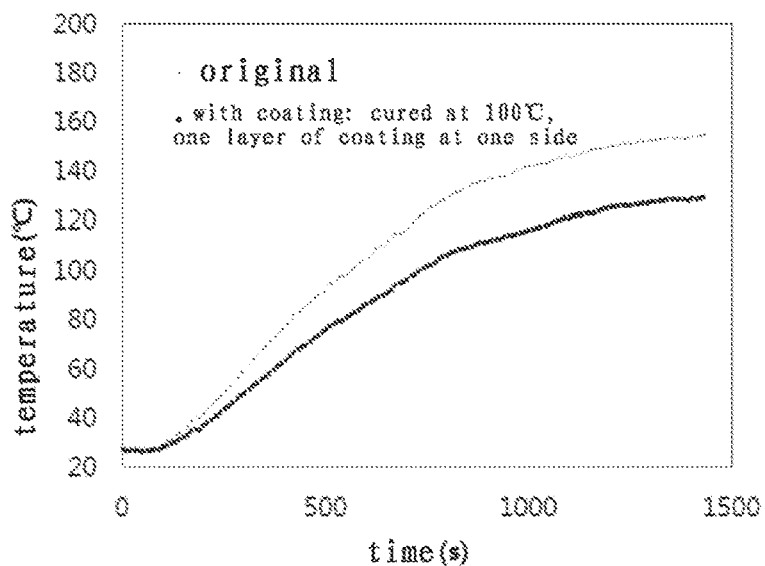

According to the present invention, a temperature for curing the coating (i.e. curing temperature) may be selected from a range between a room temperature to 100° C. In order to select a suitable curing temperature, a comparison of heat dissipating capacity is made between an electrical connection strap coated with a coating cured at different temperatures and a traditional electrical connection strap without a heat dissipation coating of high emissivity. As shown in FIGS. 3a-3c, a test of an electrical connection strap coated with one layer of a carbon nanotube coating at one side cured at the room temperature, a temperature of 50° C. and a temperature of 100° C. finds that when the curing temperature is the room temperature (about 20° C.), a maximum surface temperature difference of 19.4° C. is present between the electrical connection strap of the invention and the traditional electrical connection strap, as shown in FIG. 3a; when the curing temperature is 50° C., a maximum surface temperature difference therebetween is 31.0° C. as shown in FIG. 3b; when the curing temperature is 100° C., a maximum surface temperature difference therebetween is 26.1° C. as shown in FIG. 3c. Therefore, the curing temperature for the carbon nanotube coating, preferably, is about 50° C.

Figure 4:
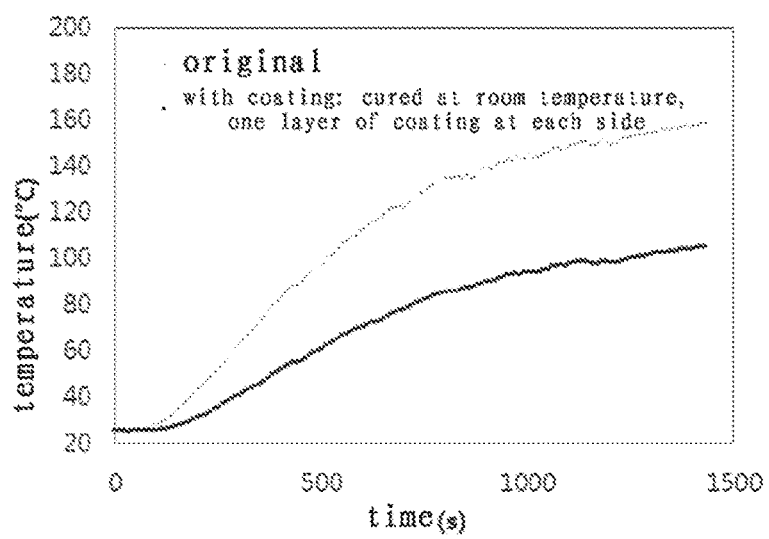
FIG. 4 shows a comparison curve of heat dissipating capability between an electrical connection strap coated with one layer of heat dissipation coating of high emissivity at both sides cured at room temperature and a traditional electrical connection strap without a heat dissipation coating of high emissivity.

Theoretically, the larger the area of the coating formed or applied onto the exposed heat dissipating surface is, the faster the heat dissipation rate is. In order to prove this point, a comparison of heat dissipating capacity is made between an electrical connection strap coated with a coating that is cured at the same temperature (the curing temperature is the room temperature in this test) and has different coating areas and a traditional electrical connection strap without a heat dissipation coating of high emissivity. FIG. 3a shows a comparison of surface temperatures between an electrical connection strap coated with a layer of carbon nanotube coating at one side cured at the room temperature and a traditional electrical connection strap, wherein a maximum surface temperature difference of 19.4° C. is present between the electrical connection strap of the present invention and the traditional electrical connection strap. FIG. 4 shows a comparison of surface temperatures between an electrical connection strap coated with a layer of carbon nanotube coating at each of the two sides cured at the room temperature and a traditional electrical connection strap, wherein a maximum surface temperature difference of 53.8° C. is present between the electrical connection strap of the present invention and the traditional electrical connection strap. Therefore, preferably, both sides of the electrical connection strap of the energy storage system, e.g. a battery and its system, are formed or coated with a heat dissipation coating of high emissivity formed of a paint containing nano particles or the like.

Figure 5A:
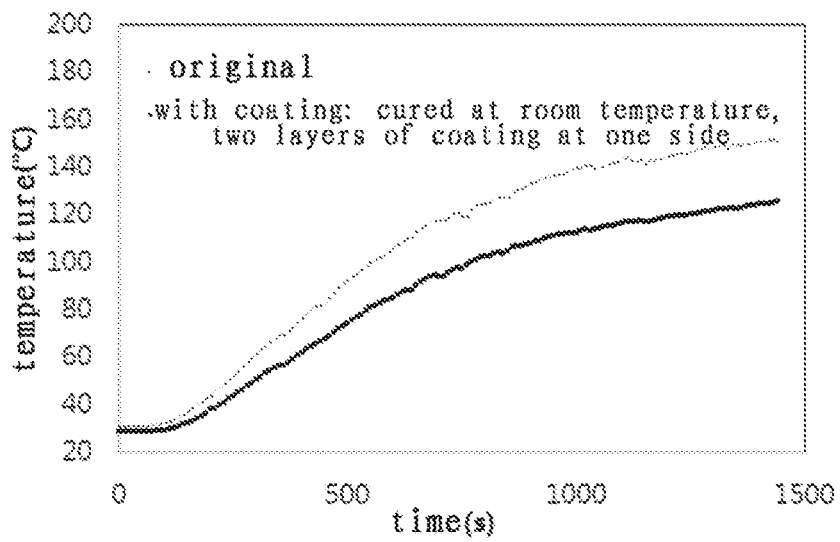
FIGS. 5a-5b show comparison curves of heat dissipating capability between an electrical connection strap coated with two and three layers of heat dissipation coating of high emissivity at one side cured at room temperature and a traditional electrical connection strap without a heat dissipation coating of high emissivity.
Figure 5B:
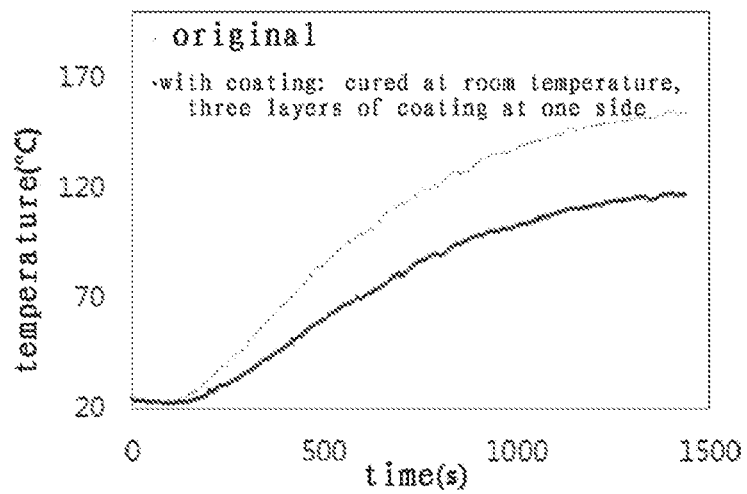

Besides, a comparison of heat dissipating capacity is also made between an electrical connection strap coated with different layers of carbon nanotube coatings cured at room temperature or a temperature of 50° C. respectively and a traditional electrical connection strap without a heat dissipation coating of high emissivity. FIG. 5a shows a comparison of the heat dissipating capacity between an electrical connection strap coated with two layers of carbon nanotube coatings at one side cured at a room temperature and a traditional electrical connection strap without a heat dissipation coating of high emissivity, wherein a maximum surface temperature difference of 26.9° C. is present between the electrical connection strap of the present invention and the traditional electrical connection strap. FIG. 5b shows a comparison of the heat dissipating capacity between an electrical connection strap coated with three layers of carbon nanotube coatings at one side cured at room temperature and a traditional electrical connection strap without a heat dissipation coating of high emissivity, wherein a maximum surface temperature difference of 37.5° C. is present between the electrical connection strap of the present invention and the traditional electrical connection strap. It is found from the results of FIGS. 5a and 5b that when the curing temperature is room temperature, the more layers of carbon nanotube coatings are coated on one side of the electrical connection strap, the better the heat dissipating capacity is.

Figure 5C:
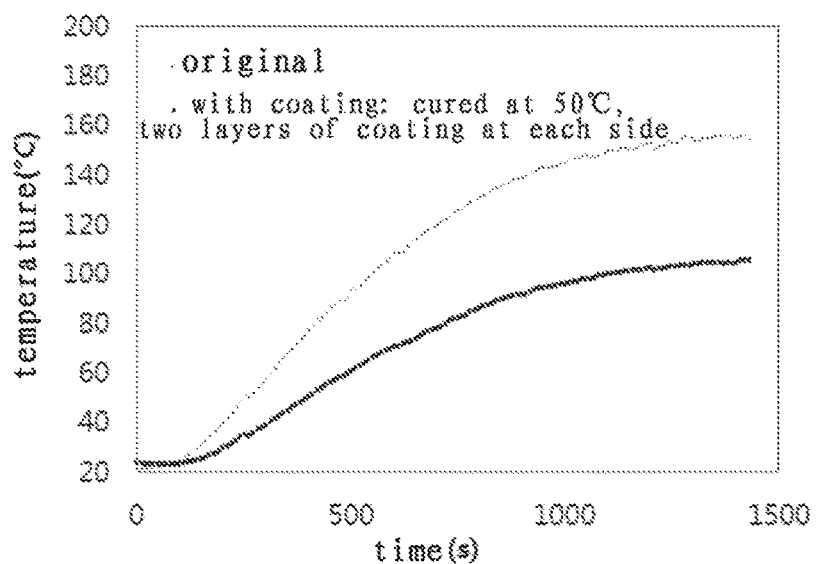
FIG. 5c shows comparison curves of heat dissipating capability between an electrical connection strap coated with two layers of heat dissipation coating of high emissivity at each of the two sides cured at a temperature of 50° C. and a traditional electrical connection strap without a heat dissipation coating of high emissivity.
Figure 5D:
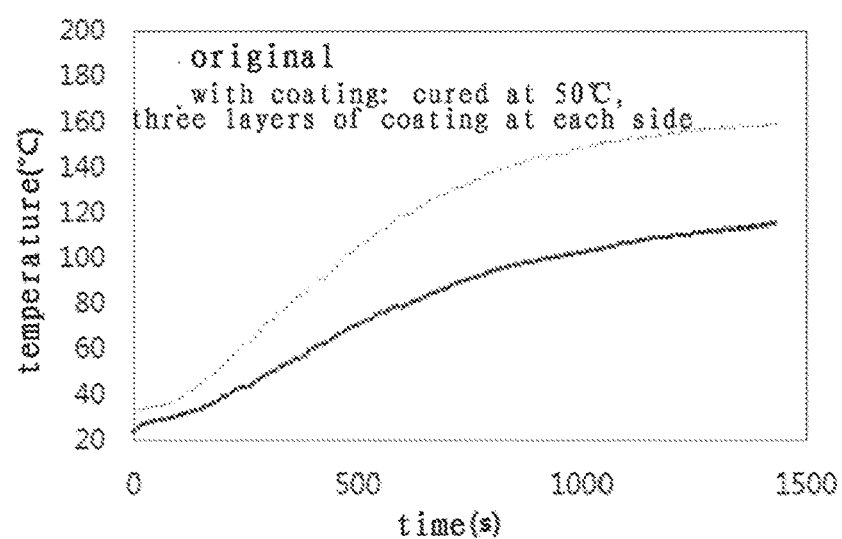
FIG. 5d shows comparison curves of heat dissipating capability between an electrical connection strap coated with three layers of heat dissipation coating of high emissivity at each of the two sides cured at a temperature of 50° C. and a traditional electrical connection strap without a heat dissipation coating of high emissivity.

When the curing temperature is 50° C., as shown in FIG. 5c, a maximum surface temperature difference of 51.9° C. is present between an electrical connection strap coated with two layers of carbon nanotube coatings at each of the two sides and a traditional electrical connection strap without a heat dissipation coating of high emissivity. Likewise, a maximum surface temperature difference of 46.4° C., as shown in FIG. 5d, is present between an electrical connection strap coated with three layers of carbon nanotube coatings at each of the two sides and a traditional electrical connection strap without a heat dissipation coating of high emissivity. Therefore, preferably, at a curing temperature of 50° C., two layers of carbon nanotube coatings are coated at each of the two sides of the electrical connection strap.

Figure 6A:
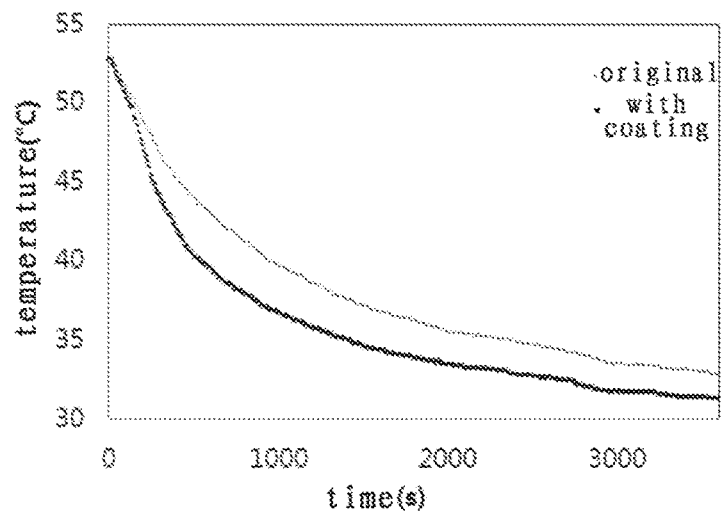
FIG. 6a shows comparison curves of heat dissipating capability of a negative terminal post between a battery connected with an electrical connection strap coated with two layers of heat dissipation coating of high emissivity at each of the two sides cured at a temperature of 50° C. and a traditional battery connected with an electrical connection strap without a heat dissipation coating of high emissivity at either side.
Figure 6B:
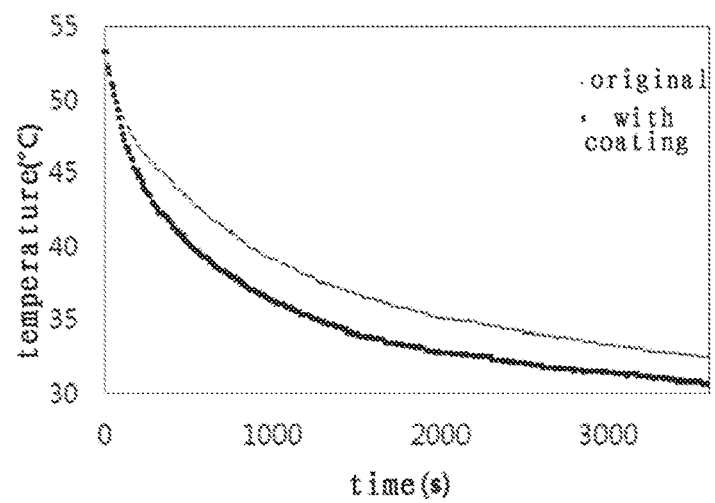
FIG. 6b shows comparison curves of heat dissipating capability of a positive terminal post between a battery connected with an electrical connection strap coated with two layers of heat dissipation coating of high emissivity at each of the two sides cured at a temperature of 50° C. and a traditional battery connected with an electrical connection strap without a heat dissipation coating of high emissivity at either side.

At the same time, a comparison of heat dissipating capacity is made between a valve-regulated type lead-acid battery connected with the electrical connection strap of the invention coated with the carbon nanotube coating and a traditional valve-regulated type lead-acid battery connected with the electrical connection strap without a carbon nanotube coating, the valve-regulated type lead-acid batteries being Leoch DJ100, wherein the electrical connection strap of the present invention connected to the valve-regulated type lead-acid battery is coated with two layers of carbon nanotube coatings at each of the two sides cured at 50° C. In order to simulate heat dissipation of different batteries that have absorbed equal amount of heat, first the batteries are heated at a certain temperature in a heating furnace until they reach a stable state and then are cooled naturally, and during this period of time, temperature at different sites of the batteries is measured by thermal couples. It is found from the test that the temperature of the battery of the present invention (typically, the temperatures of the positive terminal post and the negative terminal post) decreases in a higher rate, 16% higher than the traditional battery, dropping 3° C.-4° C. in 7 minutes, as shown in FIGS. 6a and 6b, wherein FIG. 6a is a view showing a temperature change comparison of the negative terminal post of the battery, and FIG. 6b is a view showing a temperature change comparison of the positive terminal post of the battery.

According to the present invention, in the energy storage system, the surface onto which a heat dissipation coating of high emissivity may be applied is not limited to the external surfaces of the terminal posts and/or of the electrical connection straps, but may include the external surfaces of the energy storage system and assemblies thereof, or the external surfaces of supporting structures of the energy storage system and its assemblies and etc. For an energy storage system having a plurality of terminal posts and/or electrical connection straps, frequently under a continuous high rate operation, the method for forming or applying at least one layer of heat dissipation coating of high emissivity on the at least part of the exposed heat dissipating surface exhibit better applicability and can reduce operating temperature of the energy storage system more efficiently.

The method for forming or applying at least one layer of heat dissipation coating of high emissivity onto the at least part of the exposed heat dissipating surface can be used alone or in combination with other prior art technologies for intensifying heat dissipation. For instance, a fan may be added to improve convection heat dissipation of the exposed heat dissipation surfaces.

It is necessary to note that the resistance of the electrical connection strap or terminal post itself is extremely small. Moreover, change in resistance heat of the electrical connection strap and/or terminal post is even negligible in the case of a heat dissipation coating of high emissivity, e.g. carbon nanotube coating being applied.

The above depiction is only preferred embodiments of the present invention and is not taken as limiting or restricting this invention since various modifications and variations may be made to the system and methods of the present invention without departing from the scope of the present invention through the exercise of those skilled in the art. Other embodiments may be obtained on the basis of disclosure in the description. The description and embodiments shall be considered exemplary only and the true scope of the invention is defined by the annexed claims and equivalents thereof.

The invention claimed is:

1. An energy storage system, comprising energy storage units each having two externally exposed terminal posts, an electrical connection element between the energy storage units, and a heat dissipating external surface, wherein the heat dissipating external surface comprises at least a portion of the externally exposed surface of at least one terminal post and/or the electrical connection element and wherein the heat dissipating external surface is coated or formed with at least one layer of heat dissipation coating having a black body radiation rate of greater than 0.8 and a thermal conductivity of greater than 150 W/m·K at a temperature of 300K.

2. The energy storage system according to claim 1, wherein the heat dissipation coating comprises nano particles.

3. The energy storage system according to claim 2, wherein the nano particles comprise carbon nanotubes.

4. The energy storage system according to claim 2, wherein the nano particles have a particle size of less than 100 nanometers.

5. The energy storage system according to claim 1, wherein the heat dissipation coating is cured at a temperature ranging from 40-100° C.

6. The energy storage system according to claim 5, wherein the heat dissipation coating is cured at a temperature of 50° C.

7. The energy storage system according to claim 1, wherein each layer of the heat dissipation coating has a thickness of 200-300 μm.

8. The energy storage system according to claim 1, wherein composition, thickness, or curing temperature and time for each layer of the heat dissipation coating is identical or different.

9. The energy storage system according to claim 7, wherein the number of the layers of the heat dissipation coating is 2, 3 or 4.

10. The energy storage system according to claim 1, wherein the energy storage system is a valve-regulated type lead-acid battery or a system thereof.

11. A method for preventing overheating of an energy storage system comprising energy storage units each having two externally exposed terminal posts, an electrical connection element between the energy storage units, and a heat dissipating surface comprising at least a portion of the externally exposed surface of at least one terminal post and/or the electrical connection element, the method comprising coating or forming the heat dissipating surface with at least one layer of heat dissipation coating having a black body radiation rate of greater than 0.8 and a thermal conductivity of greater than 150 W/m·K at a temperature of 300K.

12. A method for applying or forming at least one layer of heat dissipation coating onto an external surface of an energy storage system, comprising the following steps in sequence:
   (1) mixing active ingredients or precursor of the coating and stirring until a uniform paint mixture is formed;
   (2) applying the uniform paint mixture onto the external surface to form a homogeneous coating;
   (3) curing the coating at a curing temperature equal to or above room temperature until it is cured completely; and
   (4) optionally, repeating the above steps (1), (2) and (3) in sequence to form multiple layers of the heat dissipation coating onto the external surface;
   wherein the energy storage system comprises energy storage units each having two externally exposed terminal posts, an electrical connection element between the energy storage units, and an external surface;

wherein at least a portion of the external surface to which the uniform paint mixture is applied comprises an externally exposed surface of at least one terminal post and/or the electrical connection element; and wherein the heat dissipation coating has a black body radiation rate of greater than 0.8 and a thermal conductivity of greater than 150 W/m·K at a temperature of 300K.

13. The method according to claim 12, wherein the heat dissipation coating comprises nano particles.

14. The method according to claim 13, wherein the nano particles comprise carbon nanotubes.

15. The method according to claim 14, wherein the heat dissipation coating has a curing temperature ranging from 40-100° C.

16. The method according to claim 15, wherein the heat dissipation coating has a curing temperature of 50° C.

17. The method according to claim 12, wherein the heat dissipation coating a thickness of 200-300 μm.

18. The method according to claim 12, wherein paint composition, thickness, or curing temperature and time for each layer of the heat dissipation coating is identical or different.

19. The method according to claim 17, wherein the number of the layers of the heat dissipation coating is 2, 3 or 4.

* * * * *